UNITED STATES PATENT OFFICE.

JAMES YOUNG, OF MANCHESTER, ENGLAND.

IMPROVEMENT IN PROCESSES FOR MAKING STANNATES OF POTASH OR SODA.

Specification forming part of Letters Patent No. 7,588, dated August 20, 1850.

*To all whom it may concern:*

Be it known that I, JAMES YOUNG, of Manchester, in the county of Lancaster, England, manufacturing chemist, have invented or discovered new and useful Improvements in the Treatment of Certain Ores and other Matters Containing Metals, and in obtaining products therefrom; and I, the said JAMES YOUNG, do hereby declare that the nature of my invention and the manner in which the same is to be performed are particularly described and ascertained in and by this present specification or instrument in writing—that is to say:

My said invention consists of certain methods or processes for obtaining tin and other products from the ores of that metal. One of these processes consists of heating tin ore (usually called "block-tin") with sulphuret of sodium or sulphuret of potassium and afterward separating the sulphur from the compound, so as to obtain stannate of soda or stannate of potash in manner hereinafter described. The sulphurets of sodium and potassium are not, I believe, generally known as articles of commerce, and therefore I will describe the manner in which they may be made.

To make sulphuret of sodium I take about twenty-two parts, by weight, of dry sulphate of soda, and seven parts, by weight, of small coal, mix them together, and heat the mixture to redness in a reverberatory furnace. The material is to be stirred from time to time during the heating, which is to be continued until the fused mass ceases to emit any inflammable gases. The residuum remaining in the furnace is then to be taken out, and when cooled is to be washed in water, so as to dissolve out of it the sulphuret of sodium. The solution may be filtered and evaporated to dryness, or nearly so, and the product thus obtained will be sulphuret of sodium. Sulphurets of potassium may be made in precisely the same manner, substituting about twenty-seven parts, by weight, of sulphate of potash for the sulphate of soda.

In order to obtain stannate of soda from tin ore by my said process, I mix about twenty parts, by weight, of the ore (containing from eighty to ninety per cent. of peroxide of tin) with about twelve parts, by weight, of dry sulphuret of sodium, or, if moist, a proportionably larger quantity; and to obtain stannate of potash I mix about the same quantity of ore with about seventeen parts, by weight, of dry sulphuret of potassium, or, if moist, a proportionably larger quantity. These materials should be well mixed together, and if dry sulphuret has been used I add about six parts of water to the mixture. The materials are then to be dried in any convenient manner, after which they are to be heated to a red heat in a reverberatory furnace and kept at that temperature until the whole, or nearly the whole, of the peroxide of tin has been converted into a compound soluble in water. Two hours will generally be sufficient to produce this effect, and, if desired, the progress of the operation may be ascertained by, from time to time, withdrawing a small portion of the materials from the furnace and washing it in water, so as to see how much of it will dissolve and how much of the ore remains unchanged. The appearance of the unchanged ore, if any, remaining in the mixture when thus washed will be sufficiently apparent. When the ore has been sufficiently acted upon the remaining mass of material is to be removed from the furnace, and when sufficiently cool is to be washed in hot water to separate the soluble product from any insoluble matters with which it is mixed. The solution of this soluble product is to be purified from any insoluble matters or impurities by allowing them to subside and then drawing off the clear solution, or by filtering the solution through any convenient filter.

In order to procure the stannate of soda or stannate of potash from the clear solution thus obtained it is necessary that the sulphur contained in the solution should be separated from the other materials in it and replaced by an equivalent of oxygen, and any chemical agent may be employed which will effect this purpose without combining with the stannate of soda or potash or either of their elements. I prefer to use for this purpose some one of the metallic oxides—such as the hydrated oxide of iron or oxide of copper—and to boil the clear solution, obtained as before mentioned, with the oxide until the whole of the sulphur contained in it has been separated. The oxide I prefer for this purpose is the hydrated oxide of manganese, which has been precipitated or separated from a combination with an acid such as oxide of manganese separated from the muriate of manganese by lime, and which I believe to be the cheapest material available for this purpose. I use such a quantity of this hydrated oxide of manganese as will be equivalent to eleven parts, by weight, of dry oxide to the quantity of soluble material produced from twenty parts, by weight, of tin ore, as before mentioned. The quantity of hydrated oxide of iron or of oxide of copper, if used, should be chemically equivalent to the before-mentioned quantity of oxide of manganese. The solution before mentioned is to be heated with the metallic oxide, the whole being continually stirred until all the sulphur is separated from it; and in order to ascertain when the process is complete I test a portion of the solution from time to time by a salt of lead or any ordinary test for sulphur, and I continue the process and, if necessary, add more of the metallic oxide until the solution ceases to show, when tested, any trace of sulphur remaining in it. The solution thus separated from sulphur will contain stannate of soda or potash, as the case may be, with a portion of free alkali, and the solution may be separated from insoluble matters mixed with it by means of a filter, or by allowing the insoluble matters to subside, and then drawing off the clear solution. The clear solution obtained in this way may, if required, be evaporated in any convenient manner, so as to obtain the stannate of soda or potash in a dry or crystallized state.

Having now described the nature of my said invention and the manner in which the same is to be performed, I hereby declare that I claim as of my invention—

The mode of producing a stannate of soda by heating a mixture of tin ore and sulphuret of sodium, and a stannate of potash by heating a mixture of tin ore and sulphuret of potassium, and afterward separating the sulphur from these mixtures, respectively, by means of a metallic oxide, in manner hereinbefore described.

JAMES YOUNG.

Witnesses:
SAM PEARCE,
 *Vice-Consul U. S. at Liverpool.*
H. I. WILDING.